United States Patent
Kim et al.

(10) Patent No.: US 10,604,817 B2
(45) Date of Patent: Mar. 31, 2020

(54) HIGH-STRENGTH STEEL PLATE FOR PRESSURE VESSEL HAVING EXCELLENT TOUGHNESS AFTER POST WELD HEAT TREATMENT AND MANUFACTURING METHOD THEREOF

(71) Applicant: POSCO, Pohang-si (KR)

(72) Inventors: Dae-Woo Kim, Pohang-si (KR); Kyung-Keun Um, Pohang-si (KR)

(73) Assignee: POSCO, Pohang-si (KR)

(*) Notice: Subject to any disclaimer, the term of this patent is extended or adjusted under 35 U.S.C. 154(b) by 264 days.

(21) Appl. No.: 15/538,887

(22) PCT Filed: Dec. 1, 2015

(86) PCT No.: PCT/KR2015/012985
§ 371 (c)(1),
(2) Date: Jun. 22, 2017

(87) PCT Pub. No.: WO2016/104975
PCT Pub. Date: Jun. 30, 2016

(65) Prior Publication Data
US 2019/0100818 A1     Apr. 4, 2019

(30) Foreign Application Priority Data
Dec. 24, 2014   (KR) .................. 10-2014-0188466

(51) Int. Cl.
*C22C 38/04*     (2006.01)
*C21D 9/46*      (2006.01)
(Continued)

(52) U.S. Cl.
CPC .......... *C21D 8/0263* (2013.01); *C21D 9/46* (2013.01); *C22C 38/001* (2013.01); *C22C 38/02* (2013.01);
(Continued)

(58) Field of Classification Search
CPC ...... C21D 8/0263; C21D 9/46; C22C 38/001; C22C 38/02; C22C 38/04; C22C 38/06;
(Continued)

(56) References Cited

FOREIGN PATENT DOCUMENTS

| CN | 103328669 | 9/2013 |
|----|-----------|--------|
| DE | 112009000462 | 2/2011 |

(Continued)

OTHER PUBLICATIONS

English language machine translation of WO2012141220 to Hara et al. Generated Jul. 12, 2019. (Year: 2019).*

(Continued)

*Primary Examiner* — Brian D Walck
(74) *Attorney, Agent, or Firm* — Cantor Colburn LLP

(57) ABSTRACT

Provided is a high-strength steel plate for a pressure vessel having excellent low temperature toughness after a post weld heat treatment (PWHT). The high-strength steel plate for a pressure vessel includes: by wt %, 0.02-0.15% of carbon (C), 0.05-0.50% of silicon (Si), 1.0-2.0% of manganese (Mn), 0.005-0.1% of aluminum (Al), 0.015% or less of phosphorus (P), 0.0015% or less of sulfur (S), 0.01-0.03% of niobium (Nb), 0.01-0.03% of vanadium (V), 0.01-0.03% of titanium (Ti), 0.005% or less of chromium (Cr), 0.005% or less of molybdenum (Mo), 0.02-0.50% of copper (Cu), 0.05-0.60% of nickel (Ni), 0.0002-0.0010% of boron (B), 0.0035-0.0065% of nitrogen (N), and a balance of iron (Fe) and other inevitable impurities. A microstructure of the high-strength steel plate includes a complex structure of ferrite having an area fraction of 35-40% and a balance of bainite, and the bainite has a packet size of 15 μm or less.

4 Claims, 1 Drawing Sheet

(51) Int. Cl.
  *C22C 38/02* (2006.01)
  *C22C 38/06* (2006.01)
  *C22C 38/42* (2006.01)
  *C22C 38/44* (2006.01)
  *C22C 38/46* (2006.01)
  *C22C 38/48* (2006.01)
  *C22C 38/50* (2006.01)
  *C22C 38/54* (2006.01)
  *C22C 38/58* (2006.01)
  *C22C 38/38* (2006.01)
  *C21D 8/02* (2006.01)
  *C22C 38/00* (2006.01)
  *C21D 9/50* (2006.01)
  *B23K 103/04* (2006.01)

(52) U.S. Cl.
  CPC ............... *C22C 38/04* (2013.01); *C22C 38/06* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *B23K 2103/04* (2018.08); *C21D 8/0226* (2013.01); *C21D 9/50* (2013.01); *C21D 2211/002* (2013.01); *C21D 2211/004* (2013.01); *C21D 2211/005* (2013.01)

(58) Field of Classification Search
  CPC ......... C22C 38/38; C22C 38/42; C22C 38/44; C22C 38/46; C22C 38/48; C22C 38/50; C22C 38/54; C22C 38/58

USPC ....................................................... 148/653
See application file for complete search history.

(56) References Cited

FOREIGN PATENT DOCUMENTS

| JP | 08073983    | 3/1996  |
|----|-------------|---------|
| JP | 09256037    | 9/1997  |
| JP | 2010235986  | 10/2010 |
| KR | 20120110543 | 10/2012 |
| KR | 20130048980 | 5/2013  |
| KR | 20130114179 | 10/2013 |
| KR | 20140056760 | 5/2014  |
| KR | 20140098902 | 8/2014  |
| KR | 20140141839 | 12/2014 |
| WO | 2012141220  | 10/2012 |

OTHER PUBLICATIONS

International Search Report—PCT/KR2015/012985 dated Mar. 4, 2016.

European Search Report—European Application No. 15873502.7, dated Oct. 23, 2017, citing WO 2012/141220, KR 2014 0141839 and DE 11 2009 000462.

* cited by examiner (a)
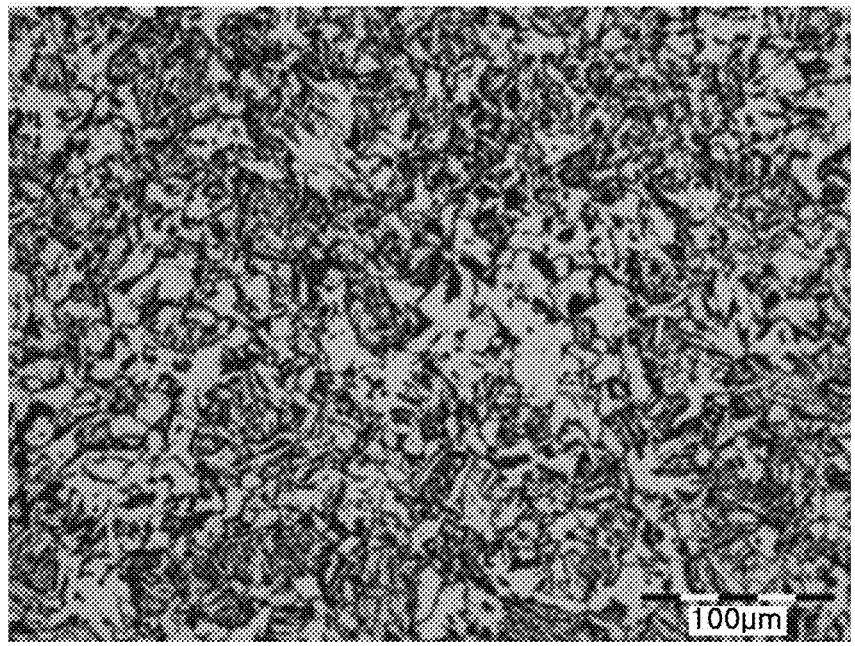
(b)
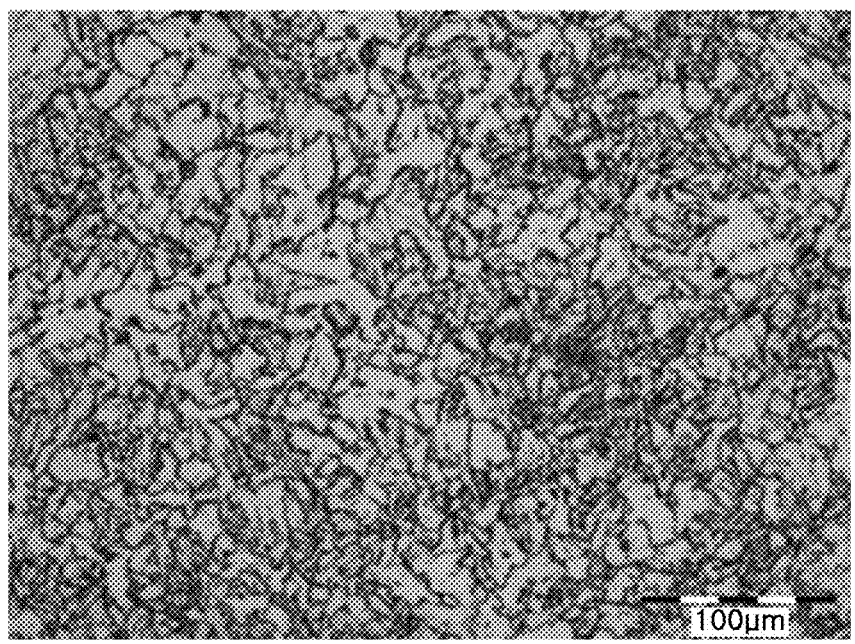

HIGH-STRENGTH STEEL PLATE FOR PRESSURE VESSEL HAVING EXCELLENT TOUGHNESS AFTER POST WELD HEAT TREATMENT AND MANUFACTURING METHOD THEREOF

TECHNICAL FIELD

The present disclosure relates to a steel plate for a pressure vessel which may be appropriately used in petrochemical production equipment, storage tanks, heat exchangers, reactors, condensers and the like and, more specifically, to a steel plate for a pressure vessel having excellent strength and toughness even after a post weld heat treatment (PWHT) and a manufacturing method thereof.

BACKGROUND ART

In recent years, demand for an increase in the size of equipment, such as petrochemical production equipment, storage tanks, and the like, and for large-capacity storage, has caused a steel plate for a pressure vessel used therein to continue to be thickened and, in particular, temperatures, at which toughness may be guaranteed, are gradually decreasing, due to an increase in use of such equipment in cold environments.

Moreover, in manufacturing large-scale structures through processes, such as welding or the like, carbon equivalents (Ceq) have been reduced, and impurities have been controlled to limits able to secure the structural stability of welded portions, as well as of base materials.

In addition, as another method for increasing the internal soundness of welded portions, there is an approach that performs a post weld heat treatment (PWHT) to remove residual stress on welded portions, preventing the deformation of a structure and securing shape and dimensionality.

Generally, PWHTs are conducted on the entirety of structures, but since base materials, in addition to welded portions, are also exposed to heat sources, even if PWHTs proceed locally, the physical properties of the base material may be degraded. As a result, when PWHTs are performed, the quality of base materials is closely related to equipment lifespan.

Meanwhile, when high-strength steel plates for pressure vessels primarily including a hard phase, such as bainite, martensite, martensite-austenite (M/A) constituents, or the like, are subjected to a PWHT for a long period of time, base materials are reduced in strength and are also increased in ductile-brittle transition temperature (DBTT) through a series of processes, such as the rediffusion of carbon, dislocation recovery, grain growth (interface migration of bainite or martensite) and carbide growth, as well as precipitation.

As described above, as a means for preventing a reduction in physical properties caused by a long-term PWHT, there is a first method that increases the amount of added alloying elements capable of increasing hardenability even when Ceqs are high to increase a fraction of a tempered low temperature phase, reducing the extent of a reduction in strength. In addition, there is a second method that increases the content of elements that are effective for solid solution strengthening, such as molybdenum (Mo), copper (Cu), silicon (Si), carbon (C), and the like, in order to increase the matrix strength of ferrite whose structures and dislocation density are not changed after a heat treatment thereof, while realizing the microstructure of quenched-tempered (Q-T) steel as a two-phase structure, including ferrite and bainite, or a three-phase structure, including a certain amount of martensite in addition to the two-phase structure.

However, both of the two methods may be highly likely to degrade the toughness of weld heat affected zones (HAZs) due to an increase in the Ceq, and to raise manufacturing costs owing to the addition of solid solution strengthening elements.

As another method, a precipitation hardening method utilizing rare earth elements is effective under specific composition range and temperature conditions.

Patent Document 1, related to this, discloses that a PWHT time may be guaranteed up to 16 hours by a process of heating and hot rolling a slab including, by wt %, 0.05-0.20% of carbon (C), 0.02-0.5% of silicon (Si), 0.2-2.0% of manganese (Mn), 0.005-0.10% of aluminum (Al), and a balance of iron (Fe) and inevitable impurities, and additionally including one or two or more of copper (Cu), nickel (Ni), chromium (Cr), molybdenum (Mo), vanadium (V), niobium (Nb), titanium (Ti), boron (B), calcium (Ca), and rare earth elements, if necessary, of air cooling the slab to room temperature, and of heating the slab at Ac1 to Ac3 transformation points and then slowly cooling it.

However, a PWHT time obtained by the above technology may be very short under the severe conditions of making thick steel plates and of welded portions, and it may be impossible to apply a PWHT for a period of time longer than the obtained PWHT time.

Thus, the development of a steel plate maintaining strength and toughness even after a long-term PWHT under the severe conditions of making thick steel plates and of welded portions, that is, having excellent resistance to a PWHT, is demanded.

Patent Document 1: Japanese Patent Laid-Open No. 1997-256037

DISCLOSURE

Technical Problem

An aspect of the present disclosure may provide a steel plate for a pressure vessel, whose strength and low temperature toughness may not be degraded even after a post weld heat treatment (PWHT) after welding for a long period of time, that is, whose resistance to a heat treatment after welding may be excellent, and a manufacturing method thereof.

Technical Solution

An aspect of the present disclosure may provide, a high-strength steel plate for a pressure vessel having excellent low temperature toughness after a post weld heat treatment (PWHT) may include: by wt %, 0.02-0.15% of carbon (C), 0.05-0.50% of silicon (Si), 1.0-2.0% of manganese (Mn), 0.005-0.1% of aluminum (Al), 0.015% or less of phosphorus (P), 0.0015% or less of sulfur (S), 0.01-0.03% of niobium (Nb), 0.01-0.03% of vanadium (V), 0.01-0.03% of titanium (Ti), 0.005% or less of chromium (Cr), 0.005% or less of molybdenum (Mo), 0.02-0.50% of copper (Cu), 0.05-0.60% of nickel (Ni), 0.0002-0.0010% of boron (B), 0.0035-0.0065% of nitrogen (N), and a balance of iron (Fe) and other inevitable impurities, in which a microstructure of the high-strength steel plate may include a complex structure of ferrite having an area fraction of 35-40% and a balance of bainite, and the bainite may have a packet size of 15 μm or less.

Advantageous Effects

According to an example, a steel plate for a pressure vessel capable of securing excellent mechanical properties by preventing strength and low temperature toughness from being degraded even after a long-term heat treatment after welding, while having a strength of 500 MPa or more, may be provided.

DESCRIPTION OF DRAWINGS

FIG. 1 is an image obtained by observing microstructures of a steel plate according to an example in the present disclosure.

BEST MODE FOR INVENTION

The present inventors have researched thick steel plates that are welded under severe conditions in depth, in order to provide steel plates having excellent strength and toughness even after a long-term post weld heat treatment (PWHT). The present inventors have confirmed that a steel plate for a pressure vessel having required mechanical properties, that is, excellent strength and toughness, may be provided, even after a long-term heat treatment at high temperatures, in the case of optimizing manufacturing conditions, as well as steel compositions, thus realizing the present disclosure.

Hereinafter, an example in the present disclosure will be described in detail.

A steel plate for a pressure vessel having excellent strength and low temperature toughness even after a PWHT, according to an aspect of the present disclosure, may preferably include, by wt %, 0.02-0.15% of carbon (C), 0.05-0.50% of silicon (Si), 1.0-2.0% of manganese (Mn), 0.005-0.1% of aluminum (Al), 0.015% or less of phosphorus (P), 0.0015% or less of sulfur (S), 0.01-0.03% of niobium (Nb), 0.01-0.03% of vanadium (V), 0.01-0.03% of titanium (Ti), 0.005% or less of chromium (Cr), 0.005% or less of molybdenum (Mo), 0.02-0.50% of copper (Cu), 0.05-0.60% of nickel (Ni), 0.0002-0.0010% of boron (B), 0.0035-0.0065% of nitrogen (N).

In addition, except for the above-mentioned components, a balance thereof may include iron (Fe) and other inevitable impurities.

Hereinafter, the reason for controlling the alloy components of the steel plate for a pressure vessel according to an example as described above will be described in detail, and unless otherwise stated, the contents of the respective components may refer to wt %.

C: 0.02-0.15%

Carbon (C) may be an element which is effective in improving strength of a steel, and it may be preferable to include 0.02% or more of C in order to sufficiently obtain the effect. However, when a content of C exceeds 0.15%, there may be concern that weldability and low temperature toughness may be unpreferably degraded.

Thus, in an example, it may be preferable to restrict the content of C to 0.02-0.15%.

Si: 0.05-0.50%

Silicon (Si) may be an element which is advantageous not only for deoxidation of molten steel, but also for improvements in strength by solid solution strengthening. It may be preferable to add 0.05% or more of Si in order to sufficiently obtain such an effect. However, when a content of Si is excessive and exceeds 0.50%, problems may occur in which weldability may be degraded and a thick oxide film may be formed on a surface of the steel.

Thus, in an example, it may be preferable to restrict the content of Si to 0.05-0.50%.

Mn: 1.0-2.0%

Manganese (Mn) may be an element which is advantageous in securing strength of the steel with a solid solution strengthening effect, and it may be preferable to add 1.0% or more of Mn in order to obtain such an effect. However, when a content of Mn exceeds 2.0%, a problem may occur in which more than 2.0% of Mn may unpreferably combine with S to form MnS, an elongated non-metallic inclusion, thus degrading room temperature ductility and low temperature toughness.

Thus, in an example, it may be preferable to restrict the content of Mn to 1.0-2.0%.

Al: 0.005-0.1%

Aluminum (Al) may be an element which is added to deoxidize the molten steel in addition to Si, and for this, 0.005% or more of Al may be required to be added. However, when a content of Al exceeds 0.1%, problems may occur in which the deoxidizing effect may be saturated, while manufacturing costs may be increased, thus being economically disadvantageous.

Thus, in an embodiment, it may be preferable to restrict the content of Al to 0.005-0.1%.

P: 0.015% or less

Phosphorus (P) may be an element which degrades low temperature toughness by being inevitably contained in a steel manufacturing process; thus, it may be preferable to control a content of P to be as low as possible.

However, since exorbitant costs are required to control the content of P to a very low level, it may be preferable to restrict the content of P to 0.015% or less.

S: 0.0015% or less

Sulfur (S) may be an element which is inevitably contained in the steel manufacturing process. Since a problem occurs in which S may combine with Mn to form MnS, an elongated non-metallic inclusion, degrading room temperature ductility and low temperature toughness, it may be preferable to control the content of S to be as low as possible.

However, since exorbitant costs are required to control the content of S to a very low level, it may be preferable to restrict the content of S to 0.0015% or less.

Nb: 0.01-0.03%

Niobium (Nb) may be effective in refining austenite grains at the time of subsequent hot rolling by being solidified in austenite at the time of reheating, and may be an important element which reinforces strength of the steel by forming a carbide/nitride (Nb(C,N)) that matches a matrix through combination with C and N.

It may be preferable to include 0.01% or more of Nb in order to sufficiently obtain the above-mentioned effect. However, when a content of Nb exceeds 0.03%, there may be concern that a coarse precipitate may be unpreferably formed, degrading toughness of the steel.

Thus, in an embodiment, it may be preferable to restrict the content of Nb to 0.01-0.03%.

V: 0.01-0.03%

Vanadium (V) may be an element which is very advantageous in increasing strength of the steel by forming a carbide/nitride, and it may be preferable to add 0.01% or more of V in order to obtain such an effect.

When a content of V is less than 0.01%, since a fine V carbide is not formed, sufficient strength may not be secured. In contrast, when the content of V exceeds 0.03%, a problem may occur in which a fraction of martensite in the structure is excessively increased to raise a size of a coarse carbide ($M_{23}C_7$), degrading impact toughness.

Thus, in an embodiment, it may be preferable to restrict the content of V to 0.01-0.03%.

Ti: 0.01-0.03%

Titanium (Ti) may be an element which is effective in increasing strength by forming a carbide/nitride in addition to V. It may be preferable to add 0.01% or more of Ti in order to obtain the above-mentioned effect. However, when a content of Ti exceeds 0.03%, there may be concern that more than 0.03% of Ti appears unpreferably as a coarse precipitate at the time of continuous casting, degrading toughness of the steel.

Thus, in an embodiment, it may be preferable to restrict the content of Ti to 0.01-0.03%.

Cr: 0.005% or less (excluding 0%)

Chromium (Cr) may be an element which is effective in increasing strength. However, when Cr is added excessively, problems may occur in which excessively added Cr has a low anticipated strength increase effect compared to Ceq increase and promotes the growth of a coarse carbide degrading impact toughness. Considering this, it may be preferable to include 0.005% or less of Cr.

Mo: 0.005% or less (excluding 0%)

Molybdenum (Mo) may be an element which is effective not only in improving strength of the steel as Cr, but also in preventing an occurrence of cracking caused by a sulfide. It may be preferable to include 0.005% or less of such Mo as an expensive element in consideration of an increase in manufacturing costs.

Cu: 0.02-0.50%

Copper (Cu) as a solid solution strengthening element may contribute to improving strength of the steel. It may be preferable to add 0.02% or more of Cu in order to obtain such an effect. However, when a content of Cu is excessive and exceeds 0.50%, the addition of an amount of Cu greater than 0.50% may be economically disadvantageous, since not only a strength improvement effect may be saturated, but also manufacturing costs may be increased.

Thus, in an example, it may be preferable to restrict the content of Cu to 0.02-0.50%.

Ni: 0.05-0.60%

Nickel (Ni) may be an element which simultaneously improves strength and toughness of the steel, and may be important in securing strength and improving brittle fracture stop characteristics of the thick steel plate in an example.

It may be preferable to add 0.05% or more of Ni in order to sufficiently obtain the above-mentioned effect. However, when a content of Ni exceeds 0.60%, a problem may occur in which since Ni is an expensive element, manufacturing costs may be highly increased.

Thus, in an example, it may be preferable to restrict the content of Ni to 0.05-0.60%.

B: 0.0002-0.0010%

Boron (B) may be an element which is effective in improving hardenability of a hot-rolled steel sheet by retarding transformation of austenite into ferrite at the time of continuous cooling transformation.

It may be preferable to add 0.0002% or more of B in order to obtain such an effect. However, when a content of B exceeds 0.0010%, a problem may occur in which a fraction of martensite in the structure may be excessively increased to raise strength exorbitantly, thus degrading impact toughness. Further, a problem may occur in which a B oxide may be unpreferably formed, degrading surface quality of the steel sheet.

Thus, in an example, it may be preferable to restrict the content of B to 0.0002-0.0010%.

N: 35-65 ppm

Nitrogen (N) may be an element which forms a carbide/nitride, such as Nb(C,N) or V(C,N), along with Nb and V, and it may be preferable to include N, within a range of 35 ppm (0.0035 wt %) to 65 ppm (0.0065 wt %), in consideration of a stoichiometric ratio of Nb to V.

When a content of N is less than 35 ppm, a nitride may not be easily formed. In contrast, when the content of N exceeds 65 ppm, free N may be formed, causing a degradation in impact toughness of the steel.

Thus, in an example, it may be preferable to restrict the content of N to 35-65 ppm.

In an example, a balance thereof may be iron (Fe). However, in a common steel manufacturing process, unintended impurities may be inevitably incorporated from raw materials or steel manufacturing environments, so that they may not be excluded. These impurities are commonly known to a person skilled in the art, and are thus not specifically mentioned in this specification.

It may be preferable that the steel plate for a pressure vessel according to an example, satisfying the above-mentioned compositions, include a complex phase of ferrite and bainite as a microstructure; and it may be preferable that the ferrite include a fraction of 35-40% and the bainite include an area fraction of 60-65%.

When the fraction of the ferrite is less than 35% or the fraction of the bainite exceeds 65%, toughness of the steel may be drastically degraded. In contrast, when the fraction of the ferrite exceeds 40% or the fraction of the bainite is less than 65%, required strength may not be secured.

Meanwhile, it may be preferable that the bainite include only packets having a size of 15 μm or less. When the packet size of the bainite exceeds 15 μm, a problem may occur in which since a propagation length is prolonged when cracks in the microstructure propagate, impact toughness may be deteriorated.

Further, the steel plate for a pressure vessel according to an example may include a carbide/nitride. At this time, the carbide/nitride may preferably be Nb(C,N), V(C,N) and $M_7C_3$.

In particular, it may be preferable that among the carbide/nitride, the Nb(C,N) have an average size of 100 nm or less and be included in a fraction of 0.01-0.05%, the V(C,N) have an average size of 30 nm or less and be included in a fraction of 0.01-0.03%, and the $M_7C_3$ have an average size of 25 nm or less and be included in a fraction of 0.01-0.02%.

As described above, in an example, required mechanical properties, particularly, excellent strength and toughness even after a PWHT may be secured by forming fine carbide/nitride.

When sizes of the carbide/nitride exceed respective limited ranges, coarse carbide/nitride may be formed, which may unpreferably degrade strength and toughness.

It may be preferable that the steel plate for a pressure vessel in an example have a Ceq of 0.42 or less, the Ceq being expressed by the following Relational Formula 1. When the Ceq exceeds 0.42, a problem may occur in which a weld heat-affected zone (HAZ) may be hardened and toughness is degraded such that structural stability may not be secured.

$$Ceq=C+Mn/6+(Cr+Mo)/5+(Ni+Cu)/15 \quad \text{[Relational Formula 1]}$$

where, C, Mn, Cr, Mo, Ni, and Cu may refer to contents (wt %) of the respective elements.

The steel plate for a pressure vessel in an example satisfying all of the above-mentioned compositions and microstructure may have excellent strength and toughness even after a PWHT and, in particular, may have excellent low temperature toughness, as well as excellent strength, such as a yield strength of 380 MPa or more, a tensile strength of 515-655 MPa, and an impact toughness of 50 J or more at −46° C. even after a heat treatment having a maximum Larson-Miller parameter (LMP) of 20.2 (×1,000).

Thus, the steel plate for a pressure vessel in an example may be preferably applied to petrochemical production equipment, storage tanks, heat exchangers, reactors, condensers and the like, which require mechanical properties as described above.

Hereinafter, a method of manufacturing a steel plate for a pressure vessel having excellent strength and low temperature toughness even after a PWHT, according to another aspect of the present disclosure, will be described in detail.

First, a steel slab satisfying the above-mentioned compositions may be prepared, and may undergo a reheating process.

At this time, it may be preferable to perform the reheating at 1,140-1,150° C. within a soaking zone of a heating furnace. When the reheating temperature is less than 1,140° C., it may be difficult to resolidify carbide/nitride, and the like, generated in the steel slab during continuous casting. In contrast, when the reheating temperature exceeds 1,150° C., a problem may occur in which since austenite grains become very coarse, physical properties of a steel sheet may be unpreferably degraded.

Thus, in an example, it may be preferable to restrict the reheating temperature to 1,140-1,150° C.

The steel slab may be preferably extracted at 1,120-1,140° C. after being reheated within the above-mentioned temperature range.

Thereafter, it may be preferable to obtain a hot-rolled steel sheet by finish rolling the reheated steel slab.

At this time, the finish hot rolling may be performed within a recrystallization temperature range, preferably within a temperature range of 920–950° C. At this time, it may be preferable to control a reduction ratio in each pass to 10% or more.

When the finish hot rolling temperature exceeds 950° C. at the time of finish hot rolling, a crystal grain growth rate of austenite may be increased, and thus refinement of the crystal grains may be impossible even after rolling. In contrast, when the finish hot rolling temperature is less than 920° C., hot rolling properties may be degraded and quality defects may occur.

Further, when the reduction ratio in each pass is less than 10%, a problem may occur in which since strain is not applied to a central portion of the steel slab, pores in the steel slab may not be squeezed, and the crystal grains of austenite in the central portion may not be easily refined.

It may be preferable to air cool the hot-rolled steel sheet manufactured as described above to room temperature and then to heat it within a temperature range of 890-910° C. for 20-40 minutes.

Thereafter, it may preferable that the heated hot-rolled steel sheet undergo a quenching process of cooling to 450° C. or lower at a cooling rate of 3° C./s or more, based on a ¼ t point thereof, where t is thickness (mm), in a thickness direction thereof.

When the cooling rate is less than 3° C./s or a cooling termination temperature exceeds 450° C., problems may occur in which coarse ferrite grains may be generated and packets of upper bainite may become coarse.

At this time, an upper limit of the cooling rate is not particularly limited, but may be restricted to 70° C./s or less in consideration of cooling equipment, and the cooling may be performed to room temperature.

It may be preferable that the hot-rolled steel sheet cooled as described above undergo a tempering process of treating it by heating at 610-640° C. for 20-60 minutes.

Problems may occur in which when the heat treatment temperature is less than 610° C., it may be difficult to form a fine precipitate, and thus the hot-rolled steel sheet may be disadvantageous in securing strength, in contrast, when the heat treatment temperature exceeds 640° C., a coarse precipitate may be formed, thus degrading strength and low temperature toughness.

There may be disadvantages that when a heat treatment time within the temperature range controlled as described above is less than 20 minutes, it may be difficult to homogenize the structure, in contrast, when the heat treatment time exceeds 60 minutes, carbides, or and carbide/nitride may become coarse, thus degrading impact toughness and also reducing productivity.

Thus, in an example, it may be preferable to perform the tempering process at 610-640° C. for 20-60 minutes.

A steel plate, according to an example, manufactured through the heat treatment process as described above, may require a PWHT process for the purpose of removing residual stress by a welding process that is added when manufacturing a pressure vessel.

In general, after an elongated PWHT process, strength and toughness may deteriorate. The steel plate manufactured according to an example may have an advantage, in that even when a heat treatment having a maximum LMP of 20.2 (×1,000) is performed, welding work may be possible without a significant reduction in strength and toughness.

In particular, the steel plate according to an example, may satisfy excellent strength and toughness, such as a yield strength of 380 MPa or more, a tensile strength of 515-655 MPa, and an impact toughness of 50 J or more at −46° C.

Hereinafter, the present disclosure will be described in more detail, according to examples. However, it should be noted that the following examples are intended to illustrate the present disclosure in more detail and not to limit the scope of the present disclosure. The scope of the present disclosure is determined by the matters described in the claims and those able to be reasonably inferred therefrom.

MODE FOR INVENTION

EXAMPLES

Hot-rolled steel sheets were manufactured by reheating steel slabs, having the compositions illustrated in Table 1 below, at 1,140-1,150° C. and then finish rolling the steel slabs under the conditions illustrated in Table 2 below. Thereafter, the respective manufactured hot-rolled steel sheets were air cooled to room temperature, and then heated within a temperature range of 890-910° C. for 20-40 minutes. Final steel plates were manufactured by performing heat treatments, such as quenching and tempering, on the respective heated hot-rolled steel sheets, under the conditions illustrated in Table 2 below.

Specimens were collected from the respective manufactured steel plates, yield strengths (YSs), tensile strengths (TSs), and impact toughnesses (CVNs) of the specimens were measured, and the results are illustrated in Table 3 below.

The impact toughnesses were measured by performing a Charpy V-notch impact test at −46° C., and after a total of three measurements, the average values thereof are shown.

At this time, the strengths and the toughnesses were measured before and after a PWHT under heat treatment conditions having a maximum LMP of 20(×1,000).

TABLE 1

| Classification | Composition (wt %) | | | | | | | | | | | | | | |
|---|---|---|---|---|---|---|---|---|---|---|---|---|---|---|---|
| | C | Si | Mn | P | S | Al | Ni | Cu | Mo | Cr | Nb | V | Ti | B* | N* |
| Inventive Steel 1 | 0.107 | 0.27 | 1.15 | 0.0055 | 0.0015 | 0.026 | 0.17 | 0.274 | 0.001 | 0.001 | 0.015 | 0.017 | 0.010 | 6 | 38 |
| Inventive Steel 2 | 0.125 | 0.35 | 1.26 | 0.0057 | 0.0012 | 0.021 | 0.18 | 0.249 | 0.003 | 0.001 | 0.021 | 0.015 | 0.012 | 5 | 42 |
| Inventive Steel 3 | 0.134 | 0.41 | 1.51 | 0.0062 | 0.0011 | 0.035 | 0.18 | 0.254 | 0.002 | 0.002 | 0.011 | 0.018 | 0.013 | 8 | 39 |
| Comparative Steel 1 | 0.051 | 0.33 | 0.73 | 0.006 | 0.0012 | 0.010 | 0.18 | 0.249 | 0.001 | 0.001 | 0.022 | 0.016 | 0.011 | 7 | 35 |
| Comparative Steel 2 | 0.127 | 0.31 | 1.91 | 0.0052 | 0.0014 | 0.015 | 0.17 | 0.261 | 0.002 | 0.002 | 0.013 | 0.018 | 0.012 | 1 | 21 |
| Comparative Steel 3 | 0.046 | 0.121 | 1.89 | 0.0075 | 0.0013 | 0.012 | 0.17 | 0.248 | 0.002 | 0.001 | 0.018 | 0.067 | 0.010 | 5 | 41 |
| Comparative Steel 4 | 0.105 | 0.31 | 1.32 | 0.0058 | 0.0013 | 0.031 | 0.01 | 0.017 | 0.001 | 0.002 | 0.015 | 0.016 | 0.012 | 5 | 45 |

(In Table 1 above, B* and N* may denote the unit of the component content in ppm).

TABLE 2

| Steel Type | Finish Hot Rolling | | | Quenching | | Tempering | | Classification |
|---|---|---|---|---|---|---|---|---|
| | T4(° C.) | T5(° C.) | Reduction Ratio per Pass (%) | Rate (° C./s) | Termination Temperature (° C.) | Temperature (° C.) | Retention Time (min) | |
| Inventive Steel 1 | 931 | 912 | 13 | 3.8 | 218 | 610 | 26 | Inventive Example 1 |
| | | | | | | 620 | | Inventive Example 2 |
| | | | | | | 630 | | Inventive Example 3 |
| | | | | | | 640 | | Inventive Example 4 |
| | 971 | 941 | 7 | 1.2 | 223 | 610 | 29 | Comparative Example 1 |
| | | | | | | 620 | | Comparative Example 2 |
| | | | | | | 630 | | Comparative Example 3 |
| | | | | | | 640 | | Comparative Example 4 |
| Inventive Steel 2 | 943 | 918 | 12 | 3.9 | 390 | 610 | 26 | Inventive Example 5 |
| | | | | | | 620 | | Inventive Example 6 |
| | | | | | | 630 | | Inventive Example 7 |
| | | | | | | 640 | | Inventive Example 8 |
| | 943 | 918 | 12 | 3.9 | 612 | 610 | 26 | Comparative Example 5 |
| | | | | | | 620 | | Comparative Example 6 |
| | | | | | | 630 | | Comparative Example 7 |
| | | | | | | 640 | | Comparative Example 8 |
| Inventive Steel 3 | 930 | 914 | 12 | 12.5 | 298 | 610 | 25 | Inventive Example 9 |
| | | | | | | 620 | | Inventive Example 10 |
| | | | | | | 630 | | Inventive Example 11 |
| | | | | | | 640 | | Inventive Example 12 |
| | 931 | 912 | 13 | 12.3 | 218 | 570 | 26 | Comparative Example 9 |
| | | | | | | 590 | | Comparative Example 10 |
| | | | | | | 660 | | Comparative Example 11 |
| | | | | | | 680 | | Comparative Example 12 |
| Comparative Steel 1 | 932 | 911 | 13 | 4.2 | 312 | 610 | 26 | Comparative Example 13 |
| | | | | | | 620 | | Comparative Example 14 |
| | | | | | | 630 | | Comparative Example 15 |
| | | | | | | 640 | | Comparative Example 16 |
| Comparative Steel 2 | 935 | 913 | 14 | 3.5 | 219 | 610 | 26 | Comparative Example 17 |
| | | | | | | 620 | | Comparative Example 18 |
| | | | | | | 630 | | Comparative Example 19 |
| | | | | | | 640 | | Comparative Example 20 |
| Comparative Steel 3 | 932 | 915 | 13 | 3.3 | 168 | 610 | 26 | Comparative Example 21 |
| | | | | | | 620 | | Comparative Example 22 |
| | | | | | | 630 | | Comparative Example 23 |
| | | | | | | 640 | | Comparative Example 24 |
| Comparative Steel 4 | 931 | 912 | 13 | 3.7 | 218 | 610 | 26 | Comparative Example 25 |
| | | | | | | 620 | | Comparative Example 26 |
| | | | | | | 630 | | Comparative Example 27 |
| | | | | | | 640 | | Comparative Example 28 |

(In Table 2, T4 may refer to a finish hot rolling initiation temperature, and T5 may refer to a finish hot rolling termination temperature).

TABLE 3

| Classification | Before PWHT | | | After PWHT | | |
|---|---|---|---|---|---|---|
| | YS(MPa) | TS(MPa) | CVN(J) | YS(MPa) | TS(MPa) | CVN(J) |
| Inventive Example 1 | 472 | 634 | 394 | 439 | 601 | 348 |
| Inventive Example 2 | 462 | 621 | 368 | 428 | 611 | 339 |
| Inventive Example 3 | 454 | 611 | 385 | 440 | 592 | 365 |
| Inventive Example 4 | 441 | 604 | 390 | 421 | 588 | 351 |
| Comparative Example 1 | 466 | 587 | 37 | 413 | 545 | 54 |
| Comparative Example 2 | 450 | 577 | 34 | 401 | 540 | 42 |
| Comparative Example 3 | 448 | 571 | 39 | 398 | 538 | 42 |
| Comparative Example 4 | 438 | 550 | 76 | 377 | 524 | 13 |
| Inventive Example 5 | 475 | 634 | 394 | 448 | 617 | 348 |
| Inventive Example 6 | 468 | 621 | 379 | 437 | 610 | 336 |
| Inventive Example 7 | 450 | 611 | 370 | 431 | 581 | 369 |
| Inventive Example 8 | 442 | 604 | 377 | 430 | 591 | 353 |
| Comparative Example 5 | 465 | 614 | 49 | 466 | 581 | 18 |
| Comparative Example 6 | 486 | 601 | 32 | 452 | 577 | 33 |
| Comparative Example 7 | 446 | 598 | 50 | 448 | 568 | 47 |
| Comparative Example 8 | 441 | 594 | 37 | 440 | 545 | 27 |
| Inventive Example 9 | 492 | 645 | 375 | 462 | 631 | 351 |
| Inventive Example 10 | 482 | 633 | 370 | 459 | 592 | 343 |
| Inventive Example 11 | 458 | 618 | 362 | 440 | 580 | 348 |
| Inventive Example 12 | 462 | 608 | 342 | 437 | 577 | 359 |
| Comparative Example 9 | 598 | 753 | 15 | 572 | 703 | 34 |
| Comparative Example 10 | 607 | 766 | 10 | 583 | 725 | 35 |
| Comparative Example 11 | 423 | 511 | 314 | 401 | 481 | 363 |
| Comparative Example 12 | 405 | 489 | 379 | 389 | 480 | 362 |
| Comparative Example 13 | 386 | 512 | 371 | 356 | 489 | 379 |
| Comparative Example 14 | 375 | 508 | 380 | 342 | 487 | 340 |
| Comparative Example 15 | 360 | 498 | 370 | 330 | 470 | 361 |
| Comparative Example 16 | 345 | 476 | 366 | 315 | 465 | 357 |
| Comparative Example 17 | 395 | 513 | 338 | 365 | 477 | 336 |
| Comparative Example 18 | 384 | 507 | 350 | 354 | 465 | 351 |
| Comparative Example 19 | 372 | 486 | 352 | 351 | 469 | 265 |
| Comparative Example 20 | 351 | 481 | 349 | 322 | 458 | 326 |
| Comparative Example 21 | 521 | 706 | 35 | 503 | 687 | 28 |
| Comparative Example 22 | 508 | 704 | 38 | 498 | 695 | 33 |
| Comparative Example 23 | 489 | 700 | 57 | 477 | 670 | 25 |
| Comparative Example 24 | 479 | 689 | 53 | 465 | 669 | 19 |
| Comparative Example 25 | 371 | 608 | 30 | 350 | 570 | 55 |
| Comparative Example 26 | 362 | 607 | 150 | 331 | 573 | 58 |
| Comparative Example 27 | 354 | 589 | 43 | 326 | 559 | 42 |
| Comparative Example 28 | 331 | 570 | 51 | 307 | 539 | 43 |

As illustrated in Tables 1 through 3, it can be seen that Inventive Examples 1 through 9 satisfying all of the steel compositions and the manufacturing conditions may have excellent strength and toughness both before and after the PWHT.

In contrast, although satisfying an example in terms of the steel compositions, Comparative Examples 1 through 12 having the manufacturing conditions that did not satisfy an example had low strength or toughness after the PWHT.

In particular, it could be seen that Comparative Examples 1 through 4 did not satisfy an example in terms of the reduction ratio in each pass and in terms of the quenching rate and that Comparative Examples 5 through 8 had a very high quenching termination temperature, a crystal grain refinement effect of austenite could not be sufficiently obtained to form coarse ferrite, thus having a very low impact toughness.

It could be seen that Comparative Examples 9 and 10 had a very low tempering temperature, and thus strength after the PWHT was significantly increased, while toughness was degraded. Further, Comparative Examples 11 and 12 had a very high tempering temperature, and thus could not secure sufficient strength.

In addition, Comparative Examples 13 through 28 satisfied an example in terms of the manufacturing conditions, but not in terms of the steel compositions, and thus strength and toughness thereof after the PWHT were degraded.

In particular, Comparative Examples 13 through 16 had an insufficient content of Mn, and thus could not sufficiently secure a solid solution strengthening effect, resulting in a degradation in strength.

Comparative Examples 17 through 20 had insufficient contents of B and N, and thus could not secure sufficient strength.

Comparative Examples 21 through 24 had an excessive content of V, and thus a fraction of martensite in the structure could be excessively increased, so that strength was greatly increased and impact toughness was degraded.

Comparative Examples 25 through 28 had insufficient contents of Ni and Cu, and thus could not secure sufficient strength and also had low impact toughness.

Further, a microstructure (A) of Comparative Example 9 using Inventive Steel 3, and a microstructure (B) manufactured under the same conditions as those of Comparative Example 9 and tempered at 620° C. were observed as illustrated in Table 1.

The two steel plates included ferrite having an area fraction of 45% and bainite having an area fraction of 55% after quenching. However, in the case of Comparative Example 9 in which subsequent tempering is performed at 570° C., it could be seen that diffusion of a carbide in bainite did not occur, and thus strength of a matrix was very high and toughness was degraded.

The invention claimed is:

1. A high-strength steel plate for a pressure vessel having an improved low temperature toughness after a post weld heat treatment (PWHT), the high-strength steel plate comprising:

by wt %, 0.02-0.15% of carbon (C), 0.05-0.50% of silicon (Si), 1.0-2.0% of manganese (Mn), 0.005-0.1% of aluminum (Al), 0.015% or less of phosphorus (P), 0.0015% or less of sulfur (S), 0.01-0.03% of niobium (Nb), 0.01-0.03% of vanadium (V), 0.01-0.03% of titanium (Ti), 0.005% or less of chromium (Cr), 0.005% or less of molybdenum (Mo), 0.02-0.50% of copper (Cu), 0.05-0.60% of nickel (Ni), 0.0002-0.0010% of boron (B), 0.0035-0.0065% of nitrogen (N), and a balance of iron (Fe) and other inevitable impurities; and a microstructure including a complex structure of ferrite having an area fraction of 35-40% and a balance of bainite, and the bainite having a packet size of 15 µm or less, wherein the steel plate has a tensile strength of 515-655 MPa, and an impact toughness of 50 J or more at −46° C. after a post weld heat treatment (PWHT).

2. The high-strength steel plate of claim 1, wherein the microstructure includes carbide/nitride, and the carbide/nitride is Nb(C,N), V(C,N) and $M_7C_3$.

3. The high-strength steel plate of claim 2, wherein the Nb(C,N) has an average size of 100 nm or less and is included in a fraction of 0.01-0.05%, the V(C,N) has an average size of 30 nm or less and is included in a fraction of 0.01-0.03%, and the $M_7C_3$ has an average size of 25 nm or less and is included in a fraction of 0.01-0.02%.

4. The high-strength steel plate of claim 1, wherein the steel plate has a carbon equivalent (Ceq) of 0.42 or less, the Ceq being expressed by the following Relational Formula 1, $$Ceq=C+Mn/6+(Cr+Mo)/5+(Ni+Cu)/15 \quad \text{[Relational Formula 1]}$$

where C, Mn, Cr, Mo, Ni, and Cu refer to contents (wt %) of the respective elements.

* * * * *